(12) United States Patent
Alicherry et al.

(10) Patent No.: US 10,142,257 B2
(45) Date of Patent: Nov. 27, 2018

(54) DYNAMIC SCALING OF REDUNDANCY ELIMINATION MIDDLEBOXES

(71) Applicant: Alcatel Lucent, Boulogne-Billancourt (FR)

(72) Inventors: Mansoor Alicherry, Bangalore (IN); Ashok Anand, Bangalore (IN); Shoban Preeth Chandrabose, Bangalore (IN)

(73) Assignee: Alcatel Lucent, Boulogne-Billiancourt (FR)

( * ) Notice: Subject to any disclaimer, the term of this patent is extended or adjusted under 35 U.S.C. 154(b) by 321 days.

(21) Appl. No.: 14/783,107

(22) PCT Filed: Mar. 27, 2014

(86) PCT No.: PCT/EP2014/000852
§ 371 (c)(1),
(2) Date: Oct. 8, 2015

(87) PCT Pub. No.: WO2014/166604
PCT Pub. Date: Oct. 16, 2014

(65) Prior Publication Data
US 2016/0036719 A1 Feb. 4, 2016

(30) Foreign Application Priority Data

Apr. 8, 2013 (IN) .......................... 1055/DEL/2013

(51) Int. Cl.
*G06F 15/16* (2006.01)
*H04L 12/911* (2013.01)
(Continued)

(52) U.S. Cl.
CPC .......... *H04L 47/78* (2013.01); *G06F 11/0709* (2013.01); *G06F 11/0751* (2013.01);
(Continued)

(58) Field of Classification Search
CPC ... H04L 47/78; H04L 47/125; H04L 43/0882; H04L 12/2854; H04L 67/1031;
(Continued)

(56) References Cited

U.S. PATENT DOCUMENTS 6,606,725 B1 * 8/2003 Wang ................ H03M 13/2957
714/755
8,789,135 B1 * 7/2014 Pani ...................... H04L 47/125
370/229
(Continued)

FOREIGN PATENT DOCUMENTS

WO WO-2013/055812 A1 4/2013

OTHER PUBLICATIONS

A. Gembert, "Stratos: Virtual Middleboxes as First-Class Entities", Jun. 18, 2012 (Jun. 18, 2012)' pp. 1-15, XP055089521, Retrieved from the Internet: URL:http:jjpages.cs.wisc.eduj-akellaj CS838/F12/838-CloudPapers/Stratos.pdf., 16 pages.
(Continued)

*Primary Examiner* — Michael A Keller
(74) *Attorney, Agent, or Firm* — Harness, Dickey, & Pierce, P.L.C.

(57) ABSTRACT

Systems and methods for dynamic scaling of RE middleboxes in a communication network are described. According to the present subject matter, the method comprises determining a load of incoming data at an encoding middlebox in the communication network. Further, the method comprises modifying a number of encoder instances in the encoding middlebox and a number of decoder instances in a decoding middlebox based on the load of incoming data.

18 Claims, 10 Drawing Sheets

(51) Int. Cl.
*H04L 29/08* (2006.01)
*G06F 11/07* (2006.01)
*H04L 12/28* (2006.01)
*H04L 12/26* (2006.01)
*H04L 12/803* (2013.01)

(52) U.S. Cl.
CPC ...... *G06F 11/0793* (2013.01); *H04L 12/2854* (2013.01); *H04L 43/0882* (2013.01); *H04L 47/125* (2013.01); *H04L 67/10* (2013.01); *H04L 67/1031* (2013.01); *H04L 67/2828* (2013.01); *H04L 67/2876* (2013.01); *H04L 67/1034* (2013.01)

(58) Field of Classification Search
CPC . H04L 67/2876; H04L 67/10; H04L 67/2828; H04L 67/1034; G06F 11/0751; G06F 11/0709; G06F 11/0793

See application file for complete search history.

(56) References Cited

U.S. PATENT DOCUMENTS

| | | | | |
|---|---|---|---|---|
| 2009/0077257 | A1* | 3/2009 | Savoor | H04L 41/0681 709/232 |
| 2011/0228793 | A1* | 9/2011 | Bajaj | H04L 49/25 370/412 |
| 2013/0279380 | A1* | 10/2013 | Hong | H04H 20/72 370/310 |
| 2014/0068602 | A1* | 3/2014 | Gember | G06F 9/45558 718/1 |
| 2015/0295807 | A1* | 10/2015 | Huang | H04L 43/062 709/224 |

OTHER PUBLICATIONS

J. Sherry,"Making middleboxes someone else's problem", X,P Applications, Technologies, Architectures, and Protocols for Computer Communication, ACM, 2 Penn Plaza, Suite 701 New York NY 10121-0701 USA, 12 pages, Aug. 13, 2012.

International Search Report PCT/ISA/210 for International Application No. PCT/EP2014/000852 dated Jun. 26, 2014.

Written Opinion of the International Searching Authority PCT/ISA/237 for International Application No. PCT/EP2014/000852 dated Jun. 26, 2014.

* cited by examiner

DYNAMIC SCALING OF REDUNDANCY ELIMINATION MIDDLEBOXES

This application is a national phase under 35 U.S.C. § 371of PCT International Application No. PCT/EP2014/0000852 which has an International filing date of Mar. 27, 2014, which claims priority to India Application No. INSN 1055/DEL/2013, filed Apr. 08, 2013, the entire contents of each of which are hereby incorporated by reference.

FIELD OF INVENTION

The present subject matter relates to communication networks and, particularly but not exclusively, to dynamic scaling of redundancy elimination middleboxes in communication networks.

BACKGROUND

In some known solutions, enterprises are consolidating their servers, such as file servers and e-mail servers, in datacenters for management simplicity. Also, some enterprises are increasingly deploying applications and services in a cloud to reduce costs associated with maintenance of multiple servers. Typically, the applications are deployed at multiple locations to provide low latency access to users. As such, the consolidation of servers and the deployment of the applications at multiple locations result in considerable wide area network (WAN) traffic between branch offices of the enterprises and datacenters, or between datacenters. The data is updated and replicated at multiple sites, which further results in significant increase in the WAN traffic.

For improving the performance of application traffic over WAN, various types of WAN optimizers may be deployed on enterprise access links. One of such WAN optimizer, which is generally used for WAN optimization, is a redundancy elimination (RE) middlebox. Typically, the RE middlebox transmits references of the redundant data in the encoded form instead of transmitting actual data across the WAN.

SUMMARY

This summary is provided to introduce concepts related to dynamic scaling of redundancy elimination middleboxes in a communication network. This summary is neither intended to identify essential features of the claimed subject matter nor is it intended for use in determining or limiting the scope of the claimed subject matter.

In accordance with an embodiment of the present subject matter, a method for dynamic scaling of redundancy elimination middleboxes in a communication network is described. The method comprises determining a load of incoming data at an encoding middlebox in the communication network. Further, the method comprises modifying a number of encoder instances in the encoding middlebox and a number of decoder instances in a decoding middlebox based on the load of incoming data.

In accordance with an embodiment of the present subject matter, a WAN optimization system for dynamic scaling of redundancy elimination middleboxes in a communication network is described. The WAN optimization system comprises an encoding middlebox configured to determine a load of incoming data at the encoding middlebox in the communication network. The encoding middlebox is further configured to modify a number of encoder instances in the encoding middlebox based on the load of incoming data. The WAN optimization system further comprises a decoding middlebox configured to modify a number of decoder instances in a decoding middlebox based in on the load of incoming data In accordance with another embodiment of the present subject matter, a computer-readable medium having computer-executable instructions for executing a method for dynamic scaling of redundancy elimination middleboxes in a communication network is described. The method comprises determining a load of incoming data at an encoding middlebox in the communication network. Further, the method comprises modifying a number of encoder instances in the encoding middlebox and a number of decoder instances in a decoding middlebox based on the load of incoming data.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of systems and/or methods in accordance with embodiments of the present subject matter are now described, by way of example only, and with reference to the accompanying figures, in which.

Figure 1:
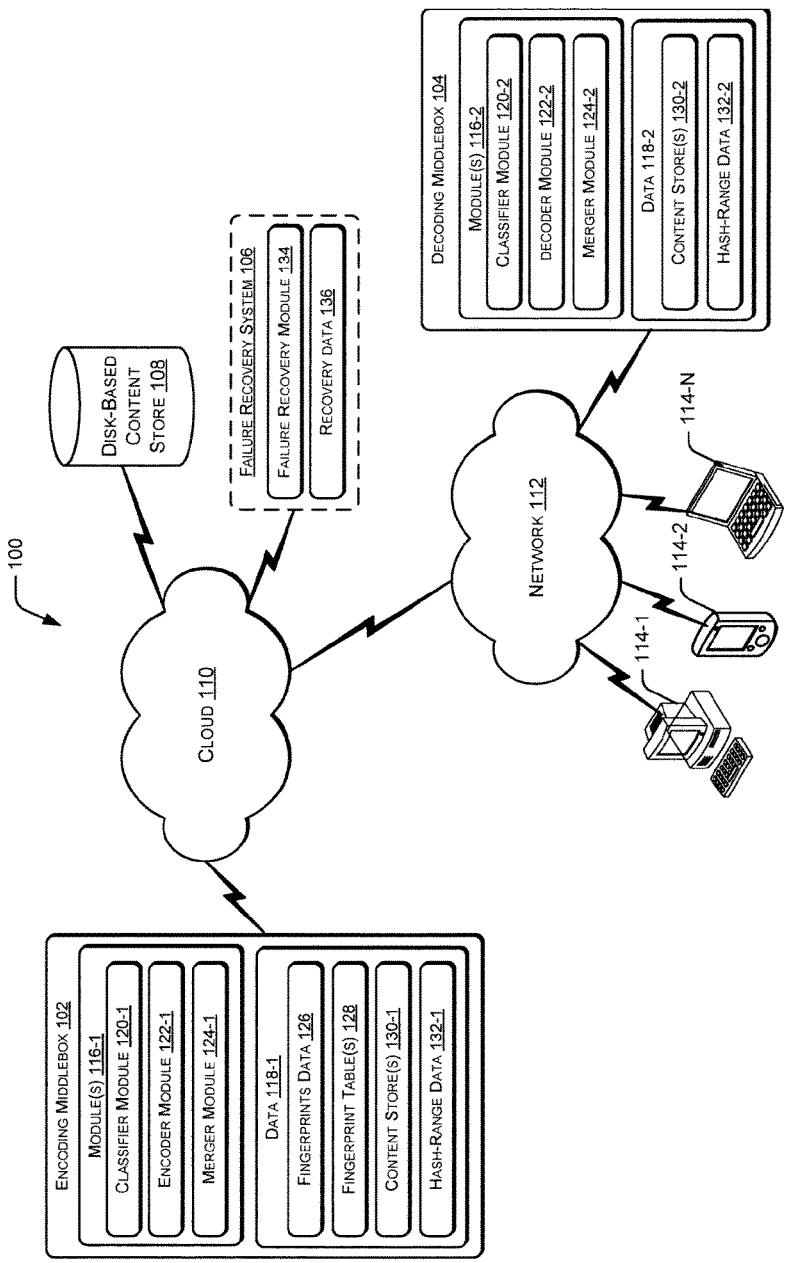
FIG. 1 illustrates a network environment 100 for dynamic scaling of redundancy middleboxes and handling failure recovery, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Method(s) and system(s) for dynamic scaling of redundancy elimination middleboxes in a communication network are described herein. The method(s) and the system(s) can be implemented in a variety of computing systems. Examples of such computing systems include, but are not restricted to, mainframe computers, workstations, personal computers, desktop computers, minicomputers, servers, multiprocessor systems, laptops, network servers, and the like.

Various WAN optimizers are commercially available for optimization of application traffic over WANs. Conventional WAN optimizers generally offer fixed types of appliances tailored for different bandwidth requirements, for example, for 2 Megabits per second (Mbps), for 4 Mbps, and for 10 Mbps. For the intermediate bandwidth requirements, such as 8 Mbps, a user may need to use the subsequent appliance type with higher capacity, and bear the unnecessary cost. Further, gains of the conventional WAN optimizers are affected by splitting traffic across instances. Typically, the WAN optimizers maintain state of past data transfers. Due to splitting of the history of past data transfers across different instances, redundancy of data in incoming content may not be suppressed if its duplicate is found in the history of the other instance. The conventional WAN optimizers do not allow change in bandwidth requirements, i.e., from a current bandwidth to a higher bandwidth or a lower bandwidth, for example, from 4 Mbps to 10 Mbps or from 4 Mbps to 2 Mbps. This type of dynamic scaling is not supported in the conventional WAN optimizers. Further, some of the conventional WAN optimizers may not be able to recover from failures of virtual machine-based appliances.

The present subject matter relates to dynamic scaling of redundancy elimination middleboxes in a communication network.

Typically, RE middleboxes comprise an encoding middlebox and a decoding middlebox which operate as a pair. The encoding middlebox encodes packets into smaller packets and the decoding middlebox reconstructs the full packets.

The encoding middlebox maintains two main data structures, a content store and a fingerprint table. The content store is responsible for storing packet data. The content store gets populated with new packets as they arrive, and old packets are evicted. The fingerprint table may contain fingerprints, also referred to as hashes, of the data and pointers to the corresponding data in the content store. At the encoding middlebox, when a packet of data arrives, the fingerprints are computed using various techniques for fingerprinting. In an example, the fingerprints may be computed using Rabin fingerprinting. Thereafter, a set of fingerprints are sampled based on certain criteria, for example, value sampling, where the last N bits of the selected fingerprints are zero. These fingerprints are looked up in the fingerprint table. If there is a match, the corresponding packet is looked up in the content store, and the match region between the incoming packet and the matched packet is expanded by doing a byte-by-byte comparison. After finding the maximal match, the matched region is replaced by a small shim header containing pointer to the packet in the content store and the size of the match. In this way, redundant content is suppressed. This technique of redundancy elimination (RE) is also known as Max-Match. In another technique of RE, known as Chunk-Match, the packet is divided into chunks, which are identified as regions between consecutively sampled fingerprints. The fingerprint table is populated with hashes of these chunks and their corresponding locations in the content store. By suitably choosing the hashing techniques which minimizes collisions, for example SHA1, the Chunk-Match alleviates the need for byte-by-byte matching on successful look up, instead directly replaces them with shim headers.

The decoding middlebox also maintains a similar content store. When the encoded packet reaches the decoding middlebox, the shim headers are replaced by the original packet by looking up the content store of the decoding middlebox. In this way, the original data is reconstructed.

In one implementation, the RE middleboxes may be used for providing RE service for the cloud. The RE service can reduce bandwidth usage between cloud datacenters, or between cloud datacenters and corporate offices, and improve performance of applications stored in the cloud. In such cases, the RE service could be deployed on multiple virtual machines (VMs). Such virtual machines may be referred to as RE instances. In one implementation, various operations in encoding and decoding may be distributed across multiple RE instances for balancing the load, while also ensuring that full benefits of RE are also retained.

In one example, for distributed encoding, there are three main components: a classifier, encoder instance(s), and a merger. The classifier receives incoming packets of data and classifies packets into different classes based on specified policies, such as round-robin, flow-based, and packet-size based. The classifier marks the packet indicating the class and also assigns a sequence number to the packet. The sequence number may be used later for reordering of the packets. Each class corresponds to an ordered list of the encoder instances. Once the classification is completed, the packets are sent to the encoder instances as specified in the ordered list. Subsequently, at the encoder instances, fingerprint or hash computation tasks are assigned to a head encoder, which is the first encoder instance in the ordered list for each class. Each encoder instance looks up for the fingerprints or hashes in its fingerprint table and content store, and encodes the packet/object if there are matches. The encoded packet is sent to the next encoder instance in the ordered list along with remaining unmatched fingerprints or hashes. The subsequent encoder instances of the class perform further encoding of the packet using their fingerprint tables and content stores. The last encoder instance of each class in the ordered list sends final encoded packets to the merger. Thereafter, the merger collects the encoded packets of all classes. The merger re-orders packets based on the sequence number and sends to the destination cloud or branch office of an enterprise.

For distributed decoding, the architecture may be similar to the architecture of distributed encoding. In one example, there are three main components: a classifier, decoder instance(s), and a merger. The classifier puts the packets in the same class as the class placed by the classifier on the encoding side. The order in which the packet of a class traverses decoder instances at the destination is reverse of the traversal order of the encoder instances at the source. Each decoder instance decodes the part of the packet for which it has the content, and then sends the partially decoded packet to the subsequent decoder instances. The last decoder instance in the class, which corresponds to the first encoder instance at the sender side, creates a complete packet and sends the packet to the merger. The merger reorders the packets that are received out of order.

In one implementation, in case of distributed Max-match based RE, the following operations are performed: storing packets, fingerprint computation, fingerprint lookups, match expansion. For distributing the task of storing packets, only the head encoder of each class stores the full packet. The head encoder inserts the corresponding fingerprints in the fingerprint table. The ordered list of encoder instances and classes are configured in such a way that each encoder instance is a head encoder in some class. For distributing fingerprint computation, the head encoder in the list is responsible for fingerprint computation. These fingerprints are sent to subsequent encoder instances in the list, so these encoder instances don't have to compute fingerprints. For distributing lookups, each encoder instance looks up the fingerprints in its fingerprint table, and sends the remaining unmatched fingerprints to the subsequent encoder instances in the ordered list. So, if all fingerprints are found in the lookup of the first encoder instance itself, no fingerprints are required to be sent to the subsequent encoder instances. In such cases, lookups may get evenly split among all the encoder instances. However, if a fingerprint is not present in the aggregate content store, the fingerprint may be looked up by all encoder instances. In these cases, the lookups may not get evenly split among all the encoder instances. However, given that in-memory lookups are generally less costly compared to other operations, it should not significantly affect scaling. For distributing match expansion, each encoder instance looks up the fingerprints and does match expansion in case of hits in its fingerprint table. To ensure that the matches for same fingerprints of a packet are not expanded by multiple encoder instances, matched fingerprints are removed and unmatched fingerprints are sent to subsequent encoder instances in the ordered list. In addition, the fingerprints which are covered in the expanded region are not looked up by the subsequent encoder instances in the ordered list, since they are already matched implicitly. The distribution of match expansion tasks depends on how content is distributed across different content stores of the encoder instances.

In one implementation, decoding may be distributed in a similar manner. In distributed decoding, there are two main operations: decoding and storing. For each class, there is an ordered list of decoder instances in the reverse order of the ordered list of the encoder instances. The last decoder instance in the ordered list is responsible for storing the full packet. By using the same set of classes used in the encoder instances, the storing also gets distributed among multiple decoder instances. Decoder instances decode the portions of the packet for which the decoder instance has content. Since encoding gets distributed across different content stores of the encoder instances, the decoding may also be distributed among different content stores of the decoder instances.

In one implementation, in case of distributed Chunk-match based RE, small chunks of the packet are stored in the content store instead of full packet and when there is a match for fingerprint or hash lookup, there is no match expansion. In said implementation, there are three operations: fingerprint or hash computation, chunk storing, and fingerprint or hash lookups. For distributing fingerprint or hash computation, computation of chunks and their fingerprints/hashes are distributed to the head encoder of the each class. For distributing chunk storing, the chunk storing responsibilities are distributed among different encoder instances. Each encoder instance is assigned a hash region. The encoder instance stores a chunk if the fingerprint or the hash of the chunk falls in the region. In an example, for a 20 byte SHA-hash and assigned hash-region of 0-0.25, the encoder instance computes a function, for example, XOR or sum, to convert 20 byte hash into some value between 0 and 1 and checks if the value is inside the range of 0-0.25. After computing chunks, the head encoder passes them to the first encoder instance in the list, which is responsible for storing the chunks based on assigned hash regions. The encoder instance stores the chunks falling in its hash region and passes the remaining chunks to the next encoder instances in the list, and so on. In one implementation, non-overlapping hash regions are used for encoder instances, and ranges of the hash regions are configured such that chunks fall into these regions with equal probability. For example, in case of four encoder instances, hash-ranges, such as (0-0.25), (0.25-0.5), (0.5-0.75), and (0.75-1) may be used for four encoder instances. In this manner, chunk storing is distributed across encoder instances. For distributing lookups, each encoder instance looks up only those hashes which fall inside its hash region. By appropriately configuring the hash regions, looks up are split equally among encoder instances.

The decoding for chunk-match based RE is similar to decoding for max-match based RE. In such case, the shim header contains information about packet identifier, and match information.

In one implementation, on-disk content stores may be used for suppressing long-term redundancy and also may be used with both Max-match and Chunk-match based RE. For the on-disk max-match RE, similar to its in-memory counterpart, the head encoder computes hashes and stores content, while other encoder instances in the list lookup and encode. In case the lookups don't get evenly split across multiple encoder instances, then the same fingerprints may be looked up by multiple encoder instances. Further, the fingerprint lookups may require disk accesses in disk-based RE, which are expensive operations.

In such cases, bloom filters may be used to ensure that with high probability, multiple encoder instances do not require disk accesses for looking up same set of fingerprints. The bloom filters are space-efficient data structures and can fit in memory unlike hash tables. For example, with a 4 Terabyte (TB) content store and 4 Kilobyte (KB) chunk size, they can be less than 1 Gigabyte (GB). If a fingerprint is present, then the bloom filter lookups would be successful with no false negatives. However, if the fingerprint is not present, then the bloom filter lookups may still be successful with false positives, and would result in disk lookups. Hence, the bloom filters should be configured properly to ensure that the probability of false positive is low.

For disk-based Chunk-RE, similar techniques may be used for distributing operations as its in-memory counterpart. The hash regions are assigned to each encoder instance's disk-based content store to distributed chunk storing and lookups, and the bloom filters to suppress unwanted disk lookups. This is how scaling of RE service is performed by distributing various operations performed for RE.

The present subject matter discloses systems and methods for dynamic scaling of RE middleboxes in a communication network. The present subject matter also provides mechanism for failure recovery in the RE middleboxes.

In one implementation, a number of encoder instances in the encoding middlebox and a number of decoder instances in the decoding middlebox are modified based on a load of incoming data at the encoding middlebox in the communication network. The number of encoder instances and the decoder instances is modified while retaining the benefits of RE as described above.

In a case, when the load of incoming data is greater than a predefined limit, one or more new encoder instances are added in the encoding middlebox. Similarly, one or more new decoder instances corresponding to the encoder instances are added in the decoding middlebox. Such type of situation may be referred to as scaling up. Depending upon the volume of data above the predefined limit, the number of encoder instances and decoder instances to be added may be determined.

In one implementation, for scaling up the RE service in case of the Max-match based RE, the classifier in the encoding middlebox may be configured to add the one or more new encoder instance. The one or more new encoder instances are also added to the ordered list of encoder instances of the existing classes, so that the one or more new encoder instances may be used for the lookup subtasks in RE. Further, new classes are defined in the classifier corresponding to the one or more new encoder instances. Each of the new classes has an encoder instance from among the one or more new encoder instances as a head encoder in their ordered list of encoder instances, so that the fingerprint computation subtasks and the store subtasks are also assigned to the one or more new encoder instances. Once the classifier is configured, the one or more new encoder instances start receiving traffic and start participating in fingerprint computations, storing, lookups and match expansions subtasks in RE. Hereinafter, for the sake of brevity, the one or more new encoder instances may be referred to as new encoder instances. The addition of the new encoder instances help in distribution of RE operations among more instances, and subsequently helping the encoding middlebox in handling more incoming bandwidth. Also, the addition of new encoder instance increases the size of aggregated packet store of the encoding middlebox, thereby assisting the encoding middlebox to identify and eliminate more redundancy.

In one implementation, for scaling up the RE service in case of the Chunk-match based RE, the classifier may be configured to add new encoder instances. While adding the new encoder instances, new hash-ranges may be associated with the encoder instances present in the encoding middlebox. The new hash-ranges may help in distributing the RE operations among the newer set of encoder instances efficiently. Further, due to re-distribution of hash-ranges, existing chunks in old hash-ranges need to be moved to new hash-ranges, which may impose overhead and increase the time for scaling. In order to move the existing chunks in the old hash-ranges to the new hash-ranges efficiently, the encoder instances may be configured to store the old hash-ranges along with the new hash-ranges. For lookups, each encoder instance may look up its content store for chunks in both the old hash-ranges and the new hash-ranges. However, new chunks are stored based on new hash-ranges. Since in-memory content stores are continuously updated, the old chunks would eventually get replaced by the new chunks. After removal of the old chunks corresponding old hash-ranges, the old hash-ranges may be discarded by the encoder instance. In this manner, the RE middlebox may be scaled up without any need for immediately moving the old chunks, while preserving RE benefits.

In one implementation, when the load of incoming data is less than the predefined limit, the one or more existing encoder instances may be removed from the encoding middlebox. Similarly, one or more existing decoder instances corresponding to the encoder instances may be removed from the decoding middlebox. Such type of situation, where the existing encoder instances and the existing decoder instances are removed, may be referred to as scaling down. Depending upon the volume of data below the predefined limit, the number of existing encoder instances and existing decoder instances to be removed may be determined.

In one implementation, for scaling down the RE service in case of the Max-match based RE, the classifier in the encoding middlebox may be configured to use all the encoder instances except one or more existing encoder instances, which need to be removed, for storing content and fingerprint computation. However, the classifier may use all encoder instances for lookups to retain the redundancy benefits. Since, the existing encoder instances, which are to be removed, also have the content that can be used for RE. After some duration of time, the content in the one or more existing encoder instances would become obsolete, since new content is being continuously inserted in the encoder instances. Once the content of the one or more new encoder instances is obsolete, the RE middlebox starts operating with the encoder instances left in the RE middlebox and the one or more existing encoder instances are discarded from the RE middlebox.

In one implementation, for scaling down the RE service in case of the Chunk-match based RE, the classifier may be configured and new hash-ranges are reassigned to the encoder instances which will be present in the RE middlebox after removal of the existing encoder instances. Before discarding or removing the one or more existing encoder instances, the content of the one or more existing encoder instances is moved to the active encoder instances left in the RE middlebox.

In one implementation, disk-based content store may be used instead of in-memory content store. The disk-based content store is external to the RE middleboxes. In case of the disk-based content store the chunks are not evicted in the order of days, so in order to expedite scaling process, lazy movement of the old chunks to their respective encoder instances as per new hash-ranges is allowed. For minimizing the need for movement, full hash-range may be divided into multiple small hash-ranges with a small range. In an example, a full hash-range 0-1 may be divided into 100 small hash-ranges having a small range of 0.01. These small hash-ranges may be distributed equally among the encoder instances. When a new encoder instance is added, portions of the hash-ranges from each of the encoder instances, which are already present in the encoding middlebox, are selected and assigned to the new encoder instances. Similarly, when an encoder instance is removed, portion of hash-ranges of the encoder instance may be assigned equally to each of the encoder instances left in the encoding middlebox.

In one implementation, the present subject matter also provides a mechanism for failure recovery in RE middleboxes. As mentioned earlier, the RE middleboxes are deployed on multiple virtual machines. Generally, it is very much possible that a virtual machine may fail in a cloud environment. For handling such failures, the present subject matter provides mechanisms to recover from virtual machine failures for each of the components, such as the classifier, the merger, the encoder instances, and the decoder instances.

Thus, the present subject matter provides a mechanism to dynamically scale up or scale down the RE operations depending upon the load of the incoming traffic without losing any RE benefits in the process. With present subject matter, an enterprise may avail the RE services based on a pay-as-per-use methodology. Now, the enterprise may dynamically scale the RE operations depending upon their usage. Further, the present subject matter is tolerant to instances failure. The present subject matter provides a failure recovery mechanism for handling failure of various components and packet loss.

The manner in which the systems and the methods for dynamic scaling of redundancy middleboxes in a communication network shall be implemented, has been explained in details with respect to FIGS. 1 to 6. While aspects of described system and method for dynamic scaling of redundancy middleboxes can be implemented in any number of different computing systems, environments, and/or configurations, the embodiments are described in the context of the following example system(s).

It should be noted that the description and figures merely illustrate the principles of the present subject matter. It will thus be appreciated that various arrangements that embody the principles of the present subject matter, although not explicitly described or shown herein, can be devised from the description and are included within its scope. Moreover, all statements herein reciting principles, aspects, and embodiments of the present subject matter, as well as specific examples thereof, are intended to encompass equivalents thereof.

FIG. 1 illustrates a network environment 100 for dynamic scaling of redundancy middleboxes and handling failure recovery, in accordance with an embodiment of the present subject matter. The network environment includes an encoding middlebox 102 and a decoding middlebox 104, collectively referred to as RE middleboxes. The RE middleboxes may be deployed on multiple virtual machines. The network environment 100 further includes a failure recovery system 106. The RE middleboxes and the failure recovery system 106 provide dynamic scaling of RE operations and handling of failure recovery, respectively. The RE middleboxes and the failure recovery system 106 together form a WAN optimization system. Further, the network environment 100 includes disk-based content store 108, which is external to the system. The disk-based content store 108 may be coupled to the virtual machines on which RE operations, performed by RE middleboxes, are deployed.

In one implementation, the encoding middlebox 102 may be deployed on virtual machines configured on a cloud 110. The cloud 110 may have applications and services of various enterprises. Similarly, the decoding middlebox 104 may be deployed on virtual machines configured on a network 112. Examples of the network 112 may include Global System for Mobile Communication (GSM) network. Universal Mobile Telecommunications System (UMTS) network, network, Time Division Multiple Access (TDMA) network, Code Division Multiple Access (CDMA) network, Next Generation Network (NGN). IP-based network, Integrated Services Digital Network (ISDN), Long Term Evolution (LTE) networks, and networks that use a variety of protocols, for example, Hypertext Transfer Protocol (HTTP), Transmission Control Protocol/Internet Protocol (TCP/IP), and Wireless Application Protocol (WAP).

Further, the network environment 100 includes a plurality of user devices 114-1, 114-2 . . . , and 114-N communicatively coupled to the network 112 through a communication link. The plurality of user devices 114-1, 114-2 . . . , and 114-N, hereinafter, are collectively referred to as user devices 114, and individually referred to as the user device 114. With the help of the user device 114 coupled to the network 112, a user in the enterprise may access various applications and services installed in the cloud 110.

In one implementation, the encoding middlebox 102 and the decoding middlebox 104 may include module(s) 116-1 and module(s) 116-2, respectively. The module(s) 116-1 and 116-2 amongst other things include routines, programs, objects, components, and data structures, which perform particular tasks or implement particular abstract data types. The modules 116-1 and 116-2 may also be implemented as signal processor(s), state machine(s), logic circuitries, and/or any other device or component that manipulate signals based on computer-readable instructions. Further, the encoding middlebox 102 and the decoding middlebox 104 may include data 118-1 and data 118-2, respectively.

In one implementation, the module(s) 116-1 include a classifier module 120-1, an encoder module 122-1, and a merger module 124-1. The modules 116-2 include a classifier module 120-2, a decoder module 122-2, and a merger module 124-2. Further, the data 118-1 includes fingerprints data 126, fingerprints table(s) 128, content store(s) 130-1, and hash-range data 132-1. The data 118-2 may include content store(s) 130-2 and hash-range data 132-2.

In one implementation, the failure recovery system 106 may include a failure recovery module 134 and recovery data 136.

In one embodiment of the present subject matter, for dynamic scaling of RE operations, when incoming data is received at the encoding middlebox 102, the classifier module 120-1 may determine a load of the incoming data at the encoding middlebox. Further, the classifier module 120-1 may be configured to set a predefined limit for the incoming data based on user inputs. The user could be a cloud service provider or a network administrator of an enterprise availing services from the cloud service provider.

Thereafter, the classifier module 120-1 may modify a number of encoder instances in the encoding middlebox 102 based on the load of the incoming data. When the number of encoder instances is modified, then at the same time, number of decoder instances is also modified in the decoding middlebox 104.

In one implementation, if the load of the incoming data is greater than the predefined limit, the classifier module 102-1 may add one or more new encoder instances in the encoding middlebox 102. Further, when the one or more new encoder instances are added, corresponding new decoder instances are also added in the decoding middlebox 104. The number of encoder instances and decoder instances to be added to the RE middleboxes is determined based on volume of data above the predefined limit. In one example, if the volume of data above the predefined limit is 2 Mbps, then 2 encoder instances and 2 decoder instances may be added to the encoding middlebox 102 and the decoding middlebox 104, respectively. Addition of the one or more new encoder instances has been discussed in more detail in conjunction with FIGS. 2(a) to 2(b) and 3(a) to 3(b).

Figure 2A:
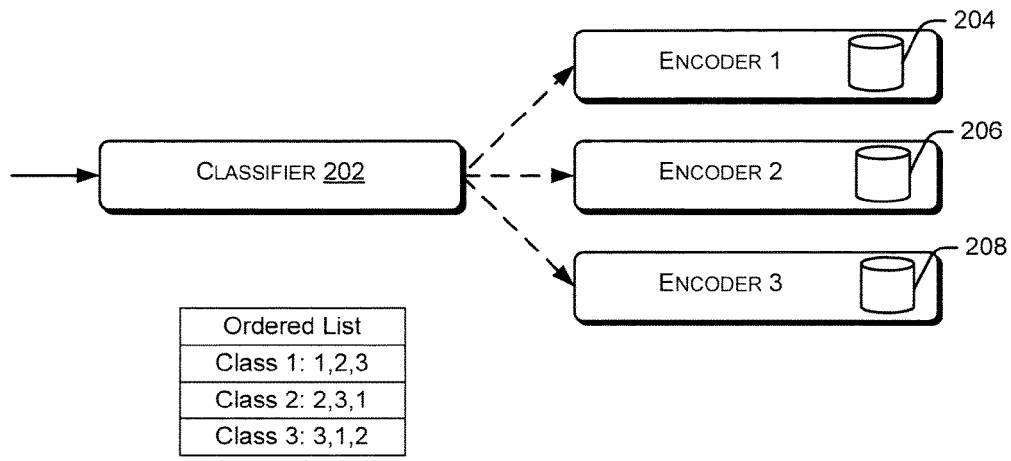
FIGS. 2(a) and 2(b) illustrate addition of a new encoder instance in case of Max-match based RE, in accordance with an embodiment of the present subject matter.
Figure 2B:
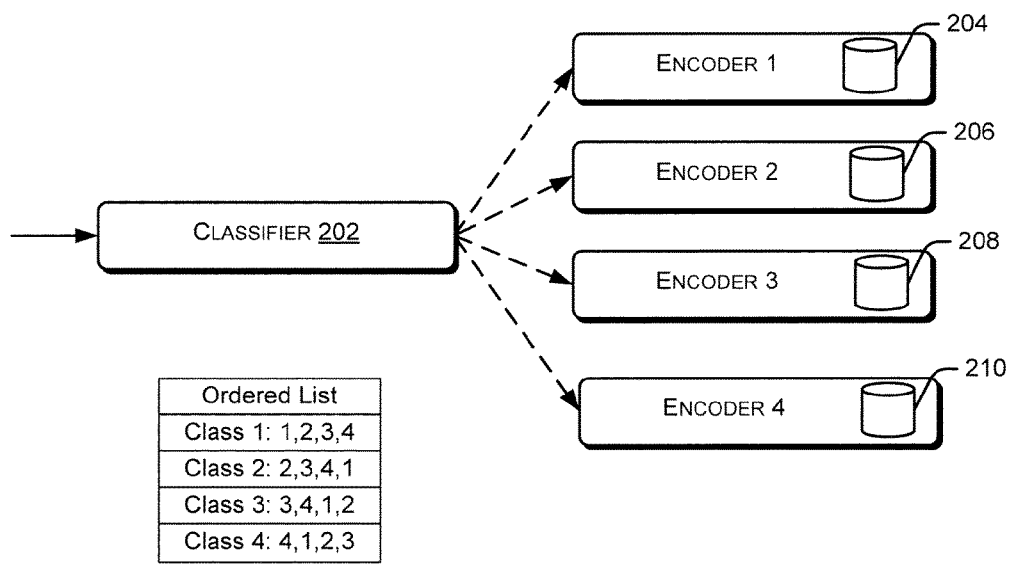

FIGS. 2(a) and 2(b) illustrate addition of a new encoder instance in case of Max-match based RE, in accordance with an embodiment of the present subject matter. The classifier module 120-1 may configure a classifier 202 to include one or more new encoder instance. The new encoder instances are added to an ordered list of the encoder instances of existing classes, so that the new encoder instances may be used for the lookup subtasks in RE. The ordered list may define an order in which the fingerprints move from one encoder instance to another encoder instance in the encoding middlebox 102. The first encoder instance in the ordered list is a head encoder responsible for computation of packets belonging to the class corresponding to the ordered list. Further, the classifier module 120-1 may define new classes in the classifier 202 corresponding to the new encoder instances. The new class may be defined based on specified policies. The specified policies may include policies, such as round-robin, flow-based, and packet-size based, based on which previous classes were defined for the encoder instances present in the encoding middlebox 102. Each of the new encoder instances is the head encoder in the ordered list of encoder instances, so that the fingerprint computation subtasks and the store subtasks are also assigned to the new encoder instances. As shown in FIG. 2(a), initially, there are three encoder instances: encoder 1, encoder 2, and encoder 3. Each of the encoder instances has its own content store. The encoder 1 has a content store 204, the encoder 2 has a content store 206, and the encoder 3 has a content store 3. Further, a class is defined for each of the encoder instances and each of the class includes the ordered list. In FIG. 2(a), class 1, class 2, and class 3 are defined for the encoder 1, the encoder 2, and encoder 3, respectively. The class 1 has the ordered list [1, 2, 3], which means that the encoder 1 is the head encoder and fingerprint computation task for the class 1 is assigned to the encoder 1. The encoder module 122-1 may provide fingerprint computation capabilities and matching of fingerprints capabilities to the encoder instances. The encoder module 122-1 may store the computed fingerprints in the fingerprints data 126. Thereafter, the encoder 1 may match the fingerprints of the packet in its content store 204. Subsequently, the unmatched fingerprints are then forwarded to the next encoder instance in the ordered list. Similarly, the unmatched data at the encoder 2 is forwarded to the encoder 3. Once the fingerprints are matched and encoded in the last encoder instance in the ordered list, the merger module 124-1 may be configured to collect the encoded packets of all the classes. Thereafter, the merger module 124-1 re-orders packets based on the sequence number and sends to the destination cloud or branch office of an enterprise.

FIG. 2(b) illustrates scaling up from 3 to 4 encoder instances in case of Max-match based RE. When an encoder 4 is added, the classifier module 120-1 may configure classifier 202 to include the encoder 4 in its existing classes. As shown in FIG. 2(b), the ordered list for the class 1, [1, 2, 3] becomes [1, 2, 3, 4]. Also, a new class is added with the encoder 4 as the head encoder. Thereafter, with this configuration, the traffic starts getting distributed across all four encoder instances and packets of data are encoded.

At the decoding middlebox 104, the classifier module 120-2 puts the packets in the same class as the one placed by the classifier module 120-1 in the encoding middlebox 102. The order in which the packet of a class traverses decoder instances at the destination is reverse of the order of the encoder instances at the encoding middlebox 102. The decoder module 122-1 may configure each of the decoder instances to decode the part of the packet for which it has the content, and then send the partially decoded packet to the subsequent decoder instances. The last decoder instance in the class, which corresponds to the first encoder instance at the sender side, creates a complete packet and sends the packet to the merger module 124-2. Then the merger module 124-2 reorders the packets if they are received out of order. Therefore, when a new encoder instance is added to the encoding middlebox 102, a corresponding new decoding instance is also added to the decoding middlebox 104. The addition of the new decoder instances is similar to the addition of the new encoder instances. Only difference is in the ordered list. For the new decoding instance the ordered list will be [3, 2, 1, 4], which is exactly reverse of the ordered list [4, 1, 2, 3] for the new encoding instance.

Figure 3A:
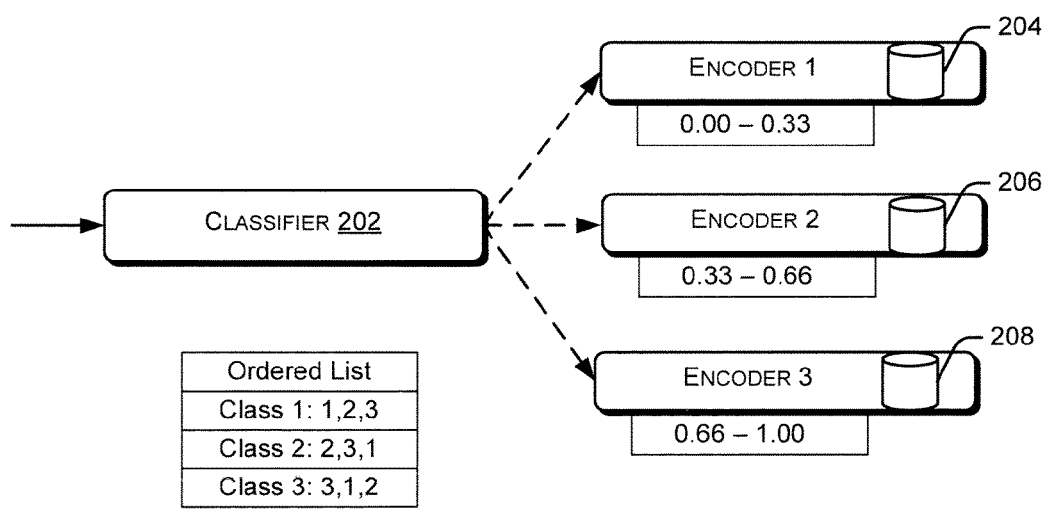
FIGS. 3(a) and 3(b) illustrate addition of the new encoder instance in case of Chunk-match based RE, in accordance with an embodiment of the present subject matter.
Figure 3B:
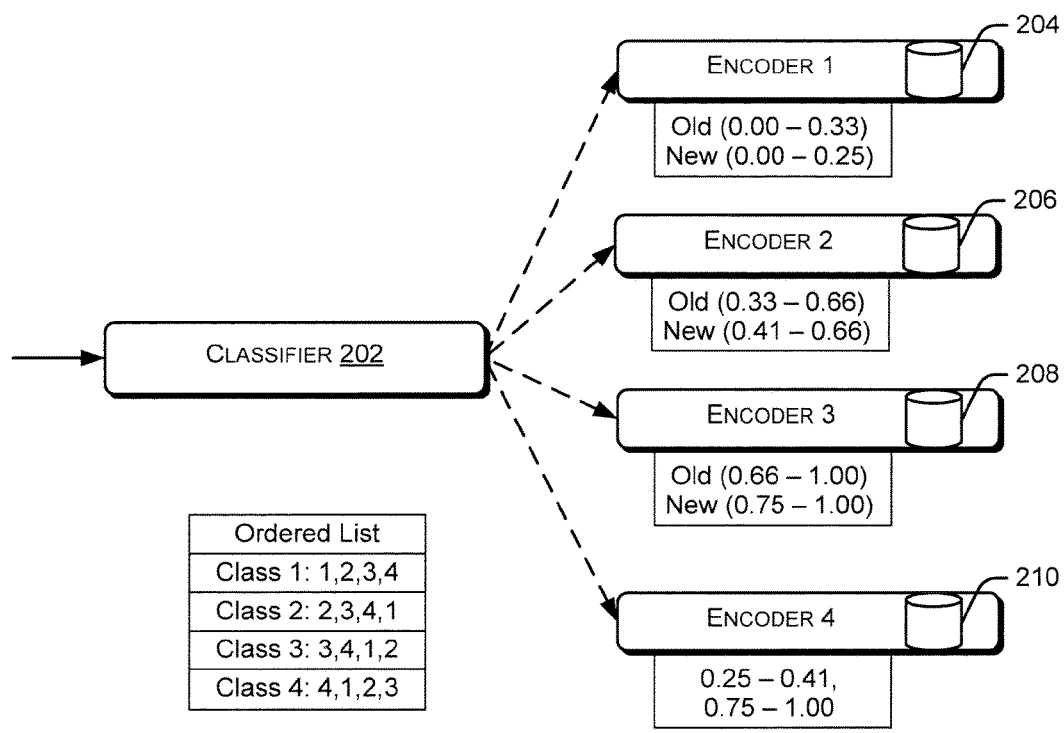

FIGS. 3(a) and 3(b) illustrate addition of the encoder instance in case of Chunk-match based RE, in accordance with an embodiment of the present subject matter. The classifier module 120-1 may configure the classifier 202 to add the new encoder instances. The classifier may assign new hash-ranges to the encoder instances present in the encoding middlebox 102. In one implementation, the encoder module 122-1 may be configured to store the old hash-ranges along with the new hash-ranges for each of the encoder instances. The encoder module 122-1 may store the old has-ranges and the new hash-ranges in the hash-range data 132-1. For lookups, each encoder instance may look up its content store for chunks in both the old hash-ranges and the new hash-ranges. However, the new chunks are stored based on new hash-ranges. Since, in-memory content stores are continuously updated, the old chunks would eventually get replaced by the new chunks. Once the old chunks in the old hash-ranges are replaced, the old hash-ranges may be discarded by the encoder module 122-1.

As shown in FIG. 3(a), the encoder 1, the encoder 2, and the encoder 3 have hash-ranges (0.00-0.33), (0.33-0.66), and (0.66-1.00), respectively. When the new encoder instance is added, the hash-ranges are redistributed. As shown in FIG. 3(b), number of the encoder instances is increased from 3 to 4. After scaling up, the new hash-ranges for the encoder 1, the encoder 2, and the encoder 3 are (0.00-0.25), (0.41-0.66), and (0.75-1.00), respectively. The new encoder instance has the hash-ranges (0.25-0.41) and (0.75-1.00). In operation after scaling up, the encoder 1, the encoder 2, and the encoder 3 look up for the chunks in both the old and new hash-ranges. However, the encoder 1, the encoder 2, and the encoder 3 stores chunks in the new hash-range. Once the old chunks are evicted, the encoder 1, the encoder 2, and the encoder 3 may discard the old hash-range, and only use the new hash-range. Similarly, new decoder instances may be added in the decoding middlebox 104 and the hash-ranges may be redistributed across all the decoder instances.

In one implementation, if the load of the incoming data is less than the predefined limit, the classifier module 102-1 may remove or discard one or more existing encoder instances in the encoding middlebox 102. The number of encoder instances and decoder instances to be removed from the RE middleboxes is determined based on volume of data below the predefined limit. The removal of the one or more existing encoder instances has been discussed in more detail in conjunction with FIG. 4(a) to 4(c) and FIG. 5(a) to 5 (c).

Figure 4A:
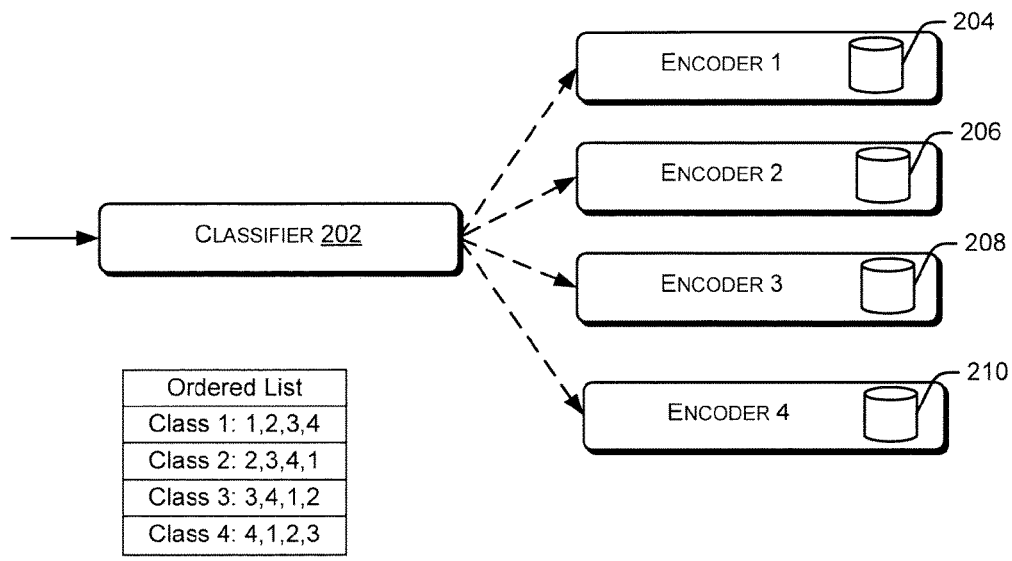
FIGS. 4(a) to 4(c) illustrate removal of an existing instance in case of Max-match based RE, in accordance with an embodiment of the present subject matter.
Figure 4B:
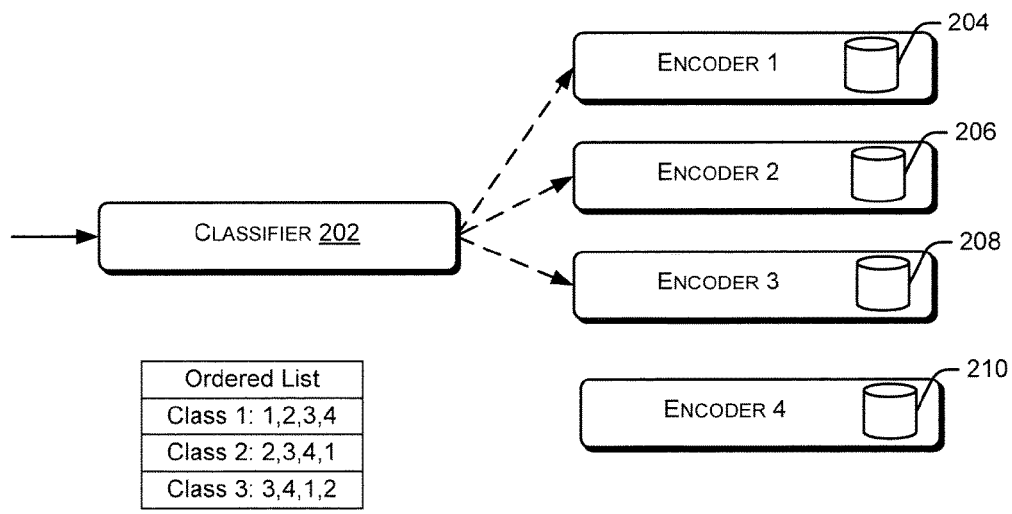
Figure 4C:
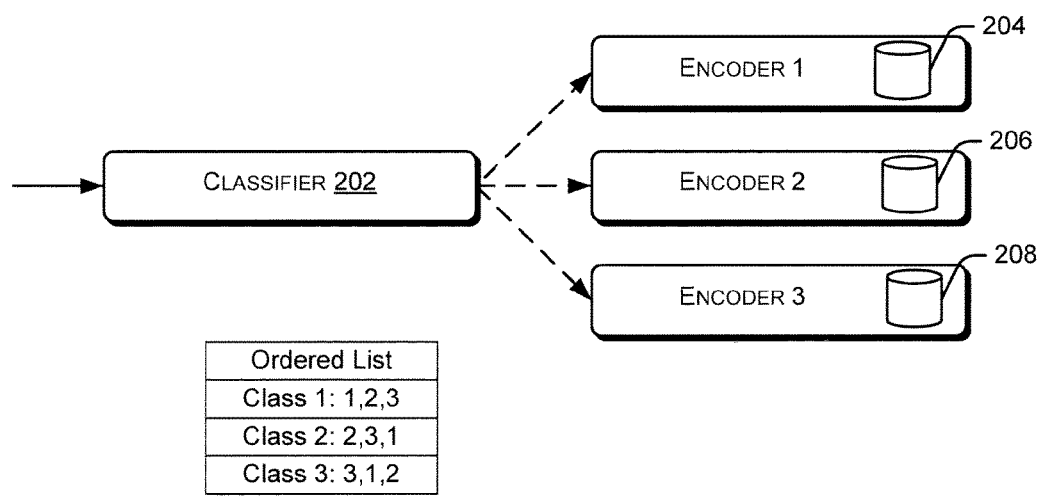

FIGS. 4(a) to 4(c) illustrate removal of the existing encoder instance in case of Max-match based RE, in accordance with an embodiment of the present subject matter. In one implementation, the classifier module 120-1 may configure the classifier 202 to use all the encoder instances except one or more existing encoder instances, which need to be removed, for storing content and fingerprint computation. However, the classifier 202 may use all the encoder instances for lookups to retain the redundancy benefits. Since, the existing encoder instances, which are to be removed, also have the content that can be used for RE. After some duration of time, the content in the one or more existing encoder instances would become obsolete, since new content is being continuously inserted in the encoder instances left in the encoding middlebox 102. Once the content of the one or more existing encoder instances is obsolete, the encoding middlebox 102 starts operating with the existing encoder instances and the one or more existing encoder instances are discarded.

As shown in FIG. 4(a), there are four encoder instances: the encoder 1, the encoder 2, the encoder 3, and the encoder 4. In an intermediate configuration, as shown in FIG. 4b), there are only three classes, each class having an ordered list. Further, the encoder 4, which is to be removed, is not a head encoder in any of the ordered lists. Therefore, the encoder 4 does not store any new content in its content store 208. However, since the encoder 4 is a part of the ordered list, the encoder 4 still performs lookups. Once the content in the encoder 4 becomes obsolete, or after the content is moved to the encoder 1, the encoder 2, and, the encoder 3, a final configuration, as shown in FIG. 4(c), is used for performing the encoding of packets. In the final configuration, there are only three encoder instances left, which are responsible for the encoding of data packets for RE.

Figure 5A:
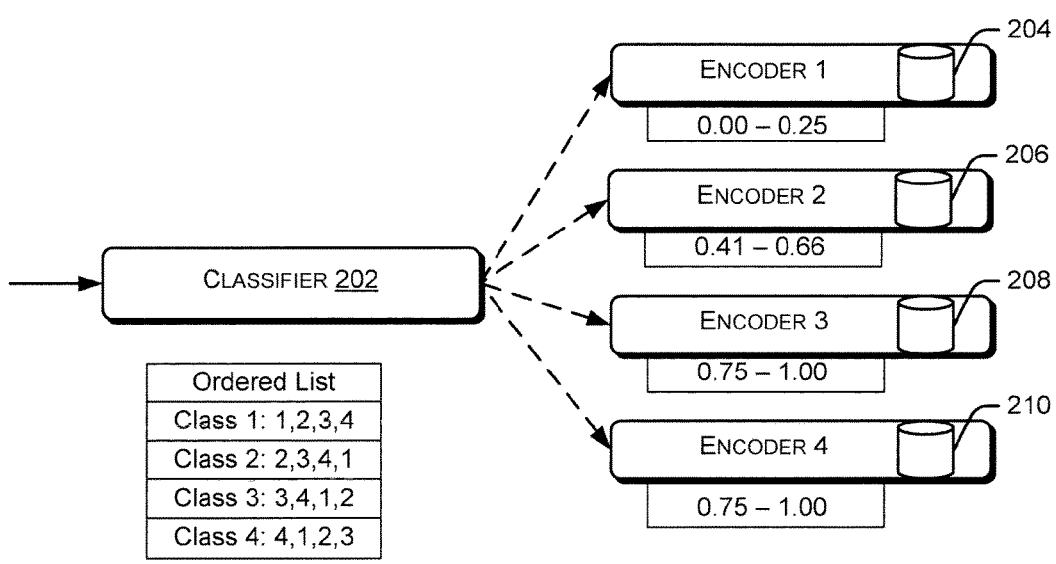
FIGS. 5(a) to 5(c) illustrate removal of the existing instance in case of Chunk-match based RE, in accordance with an embodiment of the present subject matter.
Figure 5B:
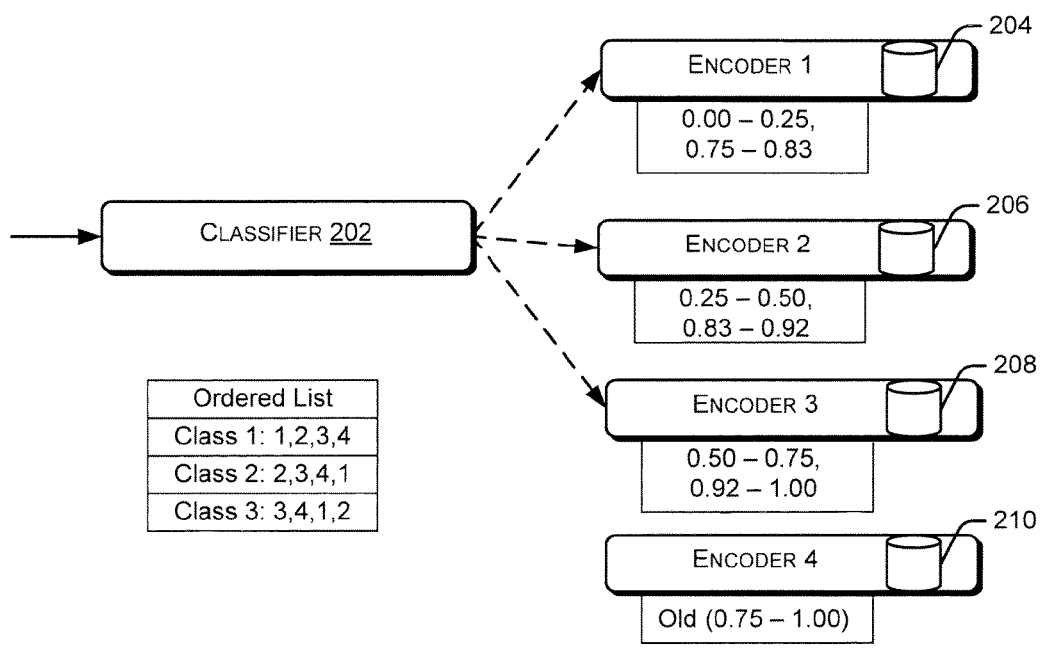
Figure 5C:
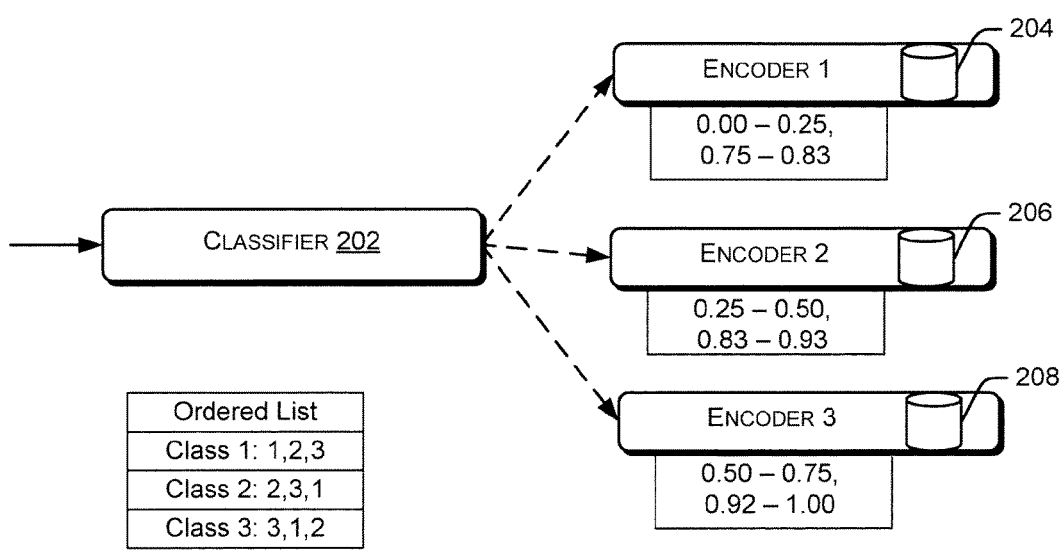

FIGS. 5(a) to 5(c) illustrate removal of the existing encoder instance in case of Chunk-match based RE, in accordance with an embodiment of the present subject matter. In one implementation, the classifier module 120-1 may configure the classifier 202 to assign new hash-ranges to the encoder instances which will be present in the encoding middlebox 102 after removal of the existing encoder instances. Before discarding or removing the one or more existing encoder instances, the content of the one or more existing encoder instances is moved to the encoder instances left in the encoding middlebox 102. As shown in FIG. 5(*a*), there are four encoder instances with a hash-range assigned to each of the encoder instances. While removing an encoder instance, in an intermediate configuration as shown in FIG. 5(*b*), the encoder 4 does not receive any content for storing. However, the encoder 4 participates in lookups for eliminating redundancy. Further, the hash-range assigned to the encoder 1 is distributed equally among all the encoder instances. As shown in FIG. 5(*b*), hash-ranges of (0.75-0.83), (0.83-0.92), and (0.92-1.00) are assigned to the encoder 1, the encoder 2, and the encoder 3, respectively. Once the chunks in the encoder 4 are moved to the encoder 1, the encoder 2, and the encoder 3, or once the chunks become obsolete, the encoder 4 may be removed from the encoding instances. As shown in FIG. 5(*c*), in a final configuration, the encoder 4 is discarded from the encoder instances and only the encoder 1, encoder 2, and the encoder 3 are responsible for encoding of the packets.

Although the Figures described above illustrate addition or removal of one new encoder instances, it may be understood to a person having ordinary skills in the art that more than one encoding instance may be added or removed in a similar manner. Further, dynamic scaling of the decoding middlebox 104 may be performed in a similar manner as performed for the encoding middlebox 102.

In one implementation, the disk-based content store 108 may used in the present subject matter instead of the in-memory in the RE middleboxes. Since, in the disk-based content store 108 the chunks are not evicted in the order of days, so in order to expedite scaling process, lazy movement of old chunks to their respective encoder instances as per the new hash-ranges is allowed. In the present subject matter, the hash-ranges are distributed in such a way that the need for movement is minimized. The full hash-range is divided into multiple small hash-ranges having small ranges. Thereafter, the small hash-ranges are distributed equally among the encoder instances. When a new encoder instance is added, portions of the hash-ranges from each of the encoder instances, present in the encoding middlebox 102, are selected and assigned to the new encoder instances. In one implementation, for checking whether a chunk's hash belongs to an encoder instance, search for all of its assigned hash-ranges may not be required. For such cases, a bitmap of all hash-ranges may be kept in each of the encoder instances and bits may be set to 1, for hash-ranges assigned to the encoder instances. By checking the corresponding bit in the bitmap, it may be identified whether a chunk's hash belongs to the encoder instance or not.

In one implementation, the failure recovery system 106 may handle failure recovery in the network environment 100, in case, virtual machines on which the RE middleboxes are deployed fail. The failure may occur for components, such as a classifier, a merger, encoder instances, and decoder instances.

In case of failure of the classifier 202, the failure recovery module 134 may configure the classifier 202 to contain small state. In one implementation, the small state may be stored in the recovery data 136. The small state may keep track of current sequence number for incoming packets. Since incoming packets are marked with these sequence numbers, so this information is also carried by incoming packets. The failure recovery module 132 may determine the maximum sequence number among all sequence numbers received by all the encoder instances, and use that as initial sequence number for the classifier. The classifier also keeps the state of how packets or flows get distributed across the encoder instances. The failure recovery module 134 may recover the state as per defined policies. For example, in case of a round-robin policy for packets, the encoder instance that has got the maximum sequence number is identified and the subsequent packet will go to the next encoder instance. In case of flow-based distribution policy, the mapping of active flows to classes from encoder instances may be retrieved and fed to the classifier 202. If the flow-distribution policy is based on some deterministic function applied on 5-tuples of any flow, such as source, destination, protocol, source port, and destination port, then retrieval of any mapping is not needed and the same deterministic function may be used for the classifier 202.

In case of failure of the merger, the failure recovery module 134 may configure the merger to contain an order state for storing the last out-of-order received packets. When the merger fails, the merger is restarted with an empty state. The higher-layer TCP will re-transmit such out-of-order received packets based on the order state and such re-transmitted packets are re-transmitted without encoding.

In case one of the encoder instances fails, then the state associated with content store 130-1 and fingerprint table 128 is lost. The in-memory content store 130-1 and fingerprint table 128 will get quickly filled by new packets, but the loss of the disk-based content store 108 and fingerprint table 128 can significantly affect RE benefits. Therefore, the failure recovery module 134 may periodically take back-up of the disk-based content store and fingerprint table 128 in the recovery data 136. When the encoder instance fails, the recovery module 134 provides the back-up of disk-based content store 108 and fingerprint table 128 to the encoding middlebox 102 for encoding.

In case one of the decoder instances fail, then the failure recovery module 134 notifies the encoder instances to not to encode packets with respect to the content store 130-2 in the failed decoder instance, since such encoded packets would not be decoded, and could lead to unnecessary re-transmissions. Then, the failure recovery module 134 may recover from the failure by using the back-up data and also notify the encoder instances to encode packets with respect to back-up data.

Further, in case of multiple failures, for example, one of the encoder instances and the classifier fail, or multiple encoder instances fail. The failure recovery module 134 handles the case of failure of multiple encoder instances similar to the case of failure of one encoder instance. Each encoder failure may be treated as independent failures. Similar is the case with multiple decoder failures. Further, the failure recovery module 134 may consider failures involving the encoder instances/the decoder instances and mergers as independent failures. In such cases, the merger gets restarted, where all the packets that are in reorder buffer of merger is lost, and the encoder instances/decoder instances are treated independently by the failure recovery module 134.

However, in case, the classifier 202 fails and one of the encoder instances fails, the failure recovery module 134 may not be able to retrieve the correct state information of classifier 202 from remaining encoder instances, which are functioning properly. In such cases, the failure recovery module 134 may obtain the sequence number from the merger of the encoding middlebox 102 or the decoding middlebox 104. Further, if there are failures on the merger of the encoding middlebox 102 and the decoding middlebox 104 also, the failure recovery module 134 may choose a sequence number that is acceptable to both the encoding middlebox 102 and the decoding middlebox 104 and use the sequence number as a starting sequence number for subsequent packets encoding.

Further, in case, when there are packet losses, the encoder instances and the decoder instances may go out of sync. That is the packet and the related hashes will be present in the content store 130-1 and the fingerprint table 128 of the encoding middlebox 102, but it will not be present in the content store 130-2 of the decoding middlebox 104. In such case, the decoder instances will not able to decode packets that were encoded by making use of lost packet's content. Therefore, in one implementation, the failure recovery module 134 may provide feedback of the decoder instance to the encoder instance regarding the lost packets. The decoder instance may use the sequence numbers of the packet to detect the lost packets and the same may be used to inform the encoder instances about the sequence numbers of received and lost packets. Further the encoder instance may encode a packet with the contents of another packet only if the later was received by the decoder instance.

Figure 6:
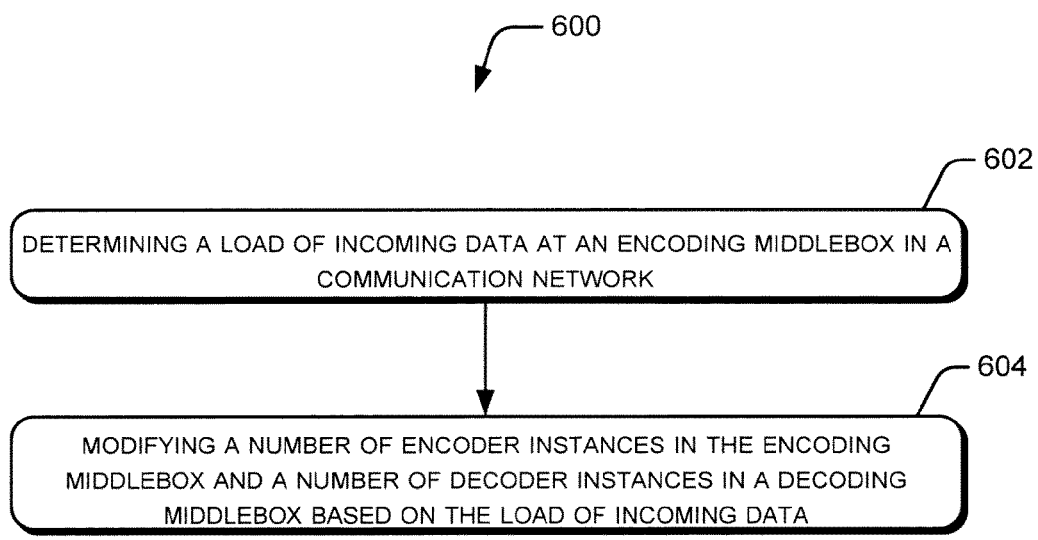
FIG. 6 illustrates a method for dynamic scaling of redundancy elimination middleboxes in the communication network, according to an embodiment of the present subject matter.

In another implementation, the failure recovery module 134 may configure the classifier 202 to keep track of a transmission control protocol (TCP) sequence numbers of the TCP flows, which is different from sequence numbers added by the classifier. The classifier 202 may detect retransmission of packets based on the TCP sequence numbers. In an example, if any packet whose TCP sequence number is smaller than the last TCP sequence number, then it is a retransmission. The encoder instance may identify that the decoder instance was unable to decode the original packet, and hence, the encoder instance does not encode the retransmitted packet In another implementation, the packet between the encoder instance and the decoder instance is sent over a reliable transport, for example, TCP. TCP handles all the packet losses and retransmits the lost packets. Further, TCP may also handle out of order packets FIG. 6 illustrates a method 600 for dynamic scaling of redundancy elimination middleboxes in the communication network, according to an embodiment of the present subject matter. The order in which the method 600 is described is not intended to be construed as a limitation, and any number of the described method blocks can be combined in any order to implement method 600, or an alternative method. Additionally, individual blocks may be deleted from the method 600 without departing from the spirit and scope of the subject matter described herein. Furthermore, the method 600 may be implemented in any suitable hardware, machine readable instructions, firmware, or combination thereof.

In one example, the steps of the method 600 can be performed by programmed computers. Herein, some examples are also intended to cover program storage devices, for example, digital data storage media, which are machine or computer readable and encode machine-executable or computer-executable programs of instructions, where said instructions perform some or all of the steps of the described method 600. The program storage devices may be, for example, digital memories, magnetic storage media such as a magnetic disks and magnetic tapes, hard drives, or optically readable digital data storage media.

With reference to method 600 as depicted in FIG. 6, as depicted in block 602, a load of incoming data at the encoding middlebox 102 is determined in the communication network. In one implementation, the classifier module 120-1 may configure a classifier 202 in the encoding middlebox 102 to determine the load of the incoming data.

At block 604, a number of encoder instances in the encoding middlebox 102 and a number of decoder instances in a decoding middlebox 104 are modified based on the load of incoming data. In one implementation, one or more new encoder instance and corresponding new decoder instances may be added to RE middleboxes on determining the load of the incoming data greater than a predefined limit. In another implementation, one or more existing encoder instances and corresponding existing decoder instances may be removed from the RE middleboxes on determining the load of the incoming data less than the predefined limit.

In one implementation, a new encoder instance may be added in the encoding middlebox 102 in case of Max-match based RE. The classifier module 120-1 may configure the classifier 202 to define a new class for the new encoder instance. The new class may have an ordered list [4, 1, 2, 3] in which the new encoder instance is a head node. Further, the ordered lists of other classes are also modified and the new encoder instance is incorporated in the ordered lists of the existing encoding instances. In another implementation, the new encoder instance may be added in case of Chunk-match based RE. The classifier module 120-1 defined a new class for the new encoder instance and assigns new hash-ranges to the encoder instances after including the new encoder instance. Till the old chunks are not evicted from old hash-ranges, the encoder instances stores both the old hash-ranges and the new hash-ranges. However, storing of new chunks is done based on the new hash-ranges. Once the old chunks are evicted, the old has-ranges may be discarded by the encoder instances. Similarly, one or more new decoder instances may be added in case of Max-match based RE or Chunk-match based RE.

In one implementation, an existing encoder instance may be removed or discarded form the encoding middlebox 102 in case of Max-match based RE. In such case, the ordered list for the class corresponding to the encoder instance may be deleted and the ordered lists of the existing encoder instance may be modified. In an intermediate configuration, the existing encoder instance, which is to be removed, participate in the lookups only. Once the content of the existing encoder instance is obsolete, the existing encoder instance is removed from the ordered lists of the classes defined for the encoder instances left in the encoding middlebox 102. In another implementation, the existing encoder instance may be removed in case of Chunk-match based RE. The hash-range of the existing encoder instance, which is to be removed, is assigned equally to the encoder instances left in the encoding middlebox 102 and the ordered list for each of the classes is modified. Once, the old chunks are evicted from the content store of the existing encoder instances, the existing encoder instances are removed from the encoding middlebox 102. Similarly, one or more new decoder instances may be removed in case of Max-match based RE or Chunk-match based RE. In one implementation, the method 600 may further comprising performing failure recovery in the RE middleboxes, as explained above in conjunction with FIG. 1.

Although implementations for dynamic scaling of redundancy elimination middleboxes in the communication network have been described in language specific to structural features and/or methods, it is to be understood that the appended claims are not necessarily limited to the specific features or methods described. Rather, the specific features and methods are disclosed as examples of systems and methods dynamic scaling of redundancy elimination middleboxes in a communication network.

We claim:

1. A method for dynamic scaling of redundancy elimination middleboxes comprising an encoding middlebox and a decoding middlebox in a communication network, the method comprising:
    determining a load of incoming data at the encoding middlebox in the communication network; and
    modifying a number of encoder instances in the encoding middlebox and a number of decoder instances in a decoding middlebox based on the load of incoming data, the modifying including configuring a classifier to define a new class corresponding to each of one or more new encoder instances and modifying an ordered list of each of the encoder instances present in the encoding middlebox before addition of the one or more new encoder instances, the ordered list relating the new class to each of the encoder instances; and
    handling failure recovery of at least one of the classifier, the encoder instances, the decoder instances, and a merger, the handling including recovering packet loss based on at least one of a decoder feedback, a transmission control packet sequence number, and a reliable transport.

2. The method as claimed in claim 1, wherein the modifying further comprises adding one or more new encoder instances on identifying the load of incoming data greater than a predefined limit, wherein the adding comprises: and
    distributing packets of data across all the encoder instances present in the encoding middlebox.

3. The method as claimed in claim 1, wherein the modifying further comprises adding one or more new encoder instances on identifying the load of incoming data greater than a predefined limit, wherein the adding comprises:
    assigning a new hash-range to each of the encoder instances based on number of the one or more new encoding instances, wherein the new hash-range and a old hash-range are stored in each of the encoder instances;
    storing chunks of packets in content stores of the encoder instances based on the new hash-ranges;
    discarding the old hash-range of each of the encoder instances when old chunks are evicted from the content stores; and
    distributing the chunks of packets across the encoder instances left in the encoding middlebox.

4. The method as claimed in claim 1, wherein the modifying further comprises removing one or more existing encoder instances on identifying the load of incoming data less than a predefined limit, wherein the removing comprises:
    discarding the ordered list of each of the one or more existing encoder instances, wherein each of the one or more existing encoder instances perform lookups and do not store any new content;
    removing each of the one or more existing encoder instances upon identifying content of the one or more existing encoder instances obsolete; and
    distributing packets of data across all encoder instances present in the encoding middlebox.

5. The method as claimed in claim 1, wherein the modifying further comprises removing one or more existing encoder instances on identifying the load of incoming data less than a predefined limit, wherein the removing comprises:
    discarding the ordered list of each of the one or more existing encoder instances, wherein the one or more existing encoder instances perform lookups and do not store any new content;
    distributing a hash-range of each of the one or more existing encoder instances equally among encoder instances present in the encoding middlebox;
    storing chunks of packets in the content store of each of the encoder instances based on a new hash-range, wherein the new hash-range for each of the encoder instance is computed based the distributing; and
    removing one or more existing encoder instances upon identifying content of the one or more existing encoder instances obsolete; and
    distributing traffic across all encoder instances present in the encoding middlebox.

6. The method as claimed in claim 1, wherein the modifying further comprises adding one or more new decoder instances on identifying the load of incoming data greater than a predefined limit, wherein the ordered list of the decoder instances is in reverse order of the ordered lists for the encoder instances, and wherein the adding comprises:
    modifying an ordered list of each of decoder instances present in the decoding middlebox before addition of the one or more decoder instances, wherein the ordered list of the decoder instances is in reverse order of the ordered lists for the encoder instances; and
    distributing encoded packets across all decoder instances present in the decoding middlebox for decoding.

7. The method as claimed in claim 1, wherein the modifying further comprises removing one or more existing decoder instances on identifying the load of incoming data less than a predefined limit, wherein the removing comprises:
    removing each of the one or more existing decoder instances from the decoding middlebox;
    modifying an ordered list of each of decoder instances present in the decoding middlebox before removal of the one or more decoder instances, wherein the ordered list of the decoder instances is in reverse order of the ordered lists for the encoder instances; and
    distributing encoded packets across all decoder instances present in the decoding middlebox for decoding.

8. The method as claimed in claim 1 further comprising handling failure recovery of at least one of a classifier, encoder instances, decoder instances, a merger, and a combination thereof.

9. A WAN optimization system for dynamic scaling of RE middleboxes in a communication network, the WAN optimization system comprising:
    an encoding middlebox, wherein the encoding middlebox,
        determines a load of incoming data at the encoding middlebox in the communication network, and
        modifies a number of encoder instances in the encoding middlebox based on the load of incoming data, the modifying including configuring a classifier to define a new class corresponding to each of one or more new encoder instances and modifying an ordered list of each of the encoder instances present in the encoding middlebox before addition of the one or more new encoder instances, the ordered list relating the new class to each of the encoder instances,
        handles failure recovery of at least one of the classifier, the encoder instances, decoder instances, and a merger, the handling including recovering packet loss based on at least one of a decoder feedback, a transmission control packet sequence number, and a reliable transport; and
a decoding middlebox, wherein the decoding middlebox, modifies a number of decoder instances in a decoding middlebox based on the load of incoming data.

10. The WAN optimization system as claimed in claim 9, wherein the encoding middlebox,
adds one or more new encoder instances on identifying the load of incoming data greater than a predefined limit; and
removes one or more existing encoder instances on identifying the load of incoming data less than the predefined limit.

11. The WAN optimization system as claimed in claim 9, wherein the decoding middlebox,
adds one or more new decoder instances upon addition of the one or more new encoder instances in the encoding middlebox; and
removes one or more existing decoder instances upon removal of the one or more existing encoder instances in the encoding middlebox.

12. The WAN optimization system as claimed in claim 9 further comprising a failure recovery system for failure recovery in the RE middleboxes, wherein the failure recovery system comprises a failure recovery module to provide mechanism for failure recovery of at least one of a classifier, encoder instances, decoder instances, a merger, and a combination thereof.

13. The WAN optimization system as claimed in claim 12, wherein the failure recovery module handles packet loss based on at least one of a decoder feedback, a transmission control protocol sequence number, and a reliable transport.

14. A non-transitory computer-readable medium having computer-executable instructions that when executed perform acts comprising:
determining a load of incoming data at an encoding middlebox in a communication network; and
modifying a number of encoder instances in the encoding middlebox and a number of decoder instances in a decoding middlebox based on a load of incoming data, the modifying including configuring a classifier to define a new class corresponding to each of one or more new encoder instances and modifying an ordered list of each of the encoder instances present in the encoding middlebox before addition of the one or more new encoder instances, the ordered list relating the new class to each of the encoder instances; and
handling failure recovery of at least one of the classifier, the encoder instances, the decoder instances, and a merger, the handling including recovering packet loss based on at least one of a decoder feedback, a transmission control packet sequence number, and a reliable transport.

15. An encoding middlebox in a communication network, wherein the encoding middlebox includes hardware having a processor configured to execute machine readable instructions to,
determine a load of incoming data at the encoding middlebox in the communication network;
modify a number of encoder instances in the encoding middlebox based on the load of incoming data, the modifying including configuring a classifier to define a new class corresponding to each of one or more new encoder instances and modifying an ordered list of each of the encoder instances present in the encoding middlebox before addition of the one or more new encoder instances, the ordered list relating the new class to each of the encoder instances; and
handle failure recovery of at least one of the classifier, the encoder instances, decoder instances, and a merger, the handling including recovering packet loss based on at least one of a decoder feedback, a transmission control packet sequence number, and a reliable transport.

16. The encoding middlebox as claimed in claim 15, wherein the encoding middlebox encodes data packets for redundancy elimination in the communication network.

17. A decoding middlebox in a communication network, wherein the decoding middlebox includes hardware having a processor configured to execute machine readable instructions to modify a number of decoder instances in the decoding middlebox based on a number of encoding instances in an encoding middlebox, the modifying including configuring a classifier to define a new class corresponding to each of one or more new encoder instances and modifying an ordered list of each of the encoder instances present in the encoding middlebox before addition of the one or more new encoder instances, the ordered list relating the new class to each of the encoder instances, and handle failure recovery of at least one of the classifier, the encoder instances, the decoder instances, and a merger, the handling including recovering packet loss based on at least one of a decoder feedback, a transmission control packet sequence number, and a reliable transport.

18. The decoding middlebox as claimed in claim 17, wherein the decoding middlebox decodes data packets encoded by the encoding middlebox for redundancy elimination in the communication network.

* * * * *